(12) United States Patent
Engelhardt et al.

(10) Patent No.: US 6,914,238 B2
(45) Date of Patent: Jul. 5, 2005

(54) METHOD AND APPARATUS FOR POINT-BY-POINT SCANNING OF A SPECIMEN

(75) Inventors: Johann Engelhardt, Bad Schoenborn (DE); Bernd Widzgowski, Dossenheim (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 133 days.

(21) Appl. No.: 10/157,561

(22) Filed: May 29, 2002

(65) Prior Publication Data

US 2002/0179828 A1 Dec. 5, 2002

(30) Foreign Application Priority Data

May 30, 2001 (DE) .......................................... 101 26 286

(51) Int. Cl.[7] .................................................. H01J 3/14
(52) U.S. Cl. ...................................... 250/234; 359/200
(58) Field of Search ................................. 250/234–236, 250/201.3; 359/196, 200, 201, 368, 369

(56) References Cited

U.S. PATENT DOCUMENTS

| | | | |
|---|---|---|---|
| 5,214,279 A | 5/1993 | Hakamata | .................... 250/234 |
| 5,496,999 A | 3/1996 | Linker et al. | ................ 250/306 |
| 5,742,419 A * | 4/1998 | Dickensheets et al. | ....... 359/201 |
| 6,037,583 A | 3/2000 | Moehler et al. | ............. 250/235 |
| 6,594,006 B1 | 7/2003 | Muehlhoff et al. | ...... 356/139.03 |

FOREIGN PATENT DOCUMENTS

| | | |
|---|---|---|
| DE | 41 24 707 | 2/1992 |
| DE | 19702752 | 7/1998 |
| DE | 197 14 221 | 10/1998 |
| DE | 199 23 821 | 11/2000 |
| EP | 8 45 693 | 6/1998 |
| WO | 99 47 964 | 2/1999 |

* cited by examiner

Primary Examiner—Thanh X. Luu
(74) Attorney, Agent, or Firm—Davidson, Davidson & Kappel, LLC

(57) ABSTRACT

A method and an apparatus for point-by-point scanning of a specimen (15) are disclosed. The method is characterized by the steps of generation (45) of a nominal signal (10) for each scan point and transfer (47) of the nominal signal to a scanning device (7). In further steps, determination (49) of an actual signal (25) for each scan point from the setting of the scanning device (7), detection (51) of at least one detection signal (21) for each scan point, calculation (53) of a display signal (27) and an image point position (29) from the actual signal (25) and/or the nominal signal (10) and the detection signal (21), and assignment (55) of the display signal (27) to the image point position (29), are performed.

19 Claims, 2 Drawing Sheets

METHOD AND APPARATUS FOR POINT-BY-POINT SCANNING OF A SPECIMEN

CROSS REFERENCE TO RELATED APPLICATIONS

This application claims priority of the German patent application 101 26 286.8-51 which is incorporated by reference herein.

FIELD OF THE INVENTION

The invention concerns a method and an apparatus for point-by-point scanning of a specimen.

BACKGROUND OF THE INVENTION

In scanning microscopy, a specimen is illuminated with a light beam in order to observe the detected light, constituting reflected or fluorescent light, emitted by the specimen. The focus of an illuminating light beam is moved in a specimen plane by means of a controllable scanning device, generally by tilting two mirrors; the deflection axes are usually perpendicular to one another, so that one mirror deflects in the X direction and the other in the Y direction. The scanning device is triggered with a nominal signal. Tilting of the mirrors is brought about, for example, by means of galvanometer positioning elements; both fast resonant as well as slower (more accurate) non-resonant galvanometers are used. The power level of the light coming from the specimen is measured as a function of the position of the scanning beam. The positioning elements are usually equipped with sensors to determine the present mirror position (actual signal). The actual signal is usually assigned unequivocally to the respective detection signal so that an image can be generated.

In confocal scanning microscopy specifically, a specimen is scanned in three dimensions with the focus of a light beam.

A confocal scanning microscope generally comprises a light source, a focusing optical system with which the light of the source is focused onto an aperture stop (called the "excitation stop"), a beam splitter, a scanning device for beam control, a microscope optical system, a detection stop, and the detectors for detecting the detection or fluorescent light. The illuminating light is coupled in via a beam splitter. The fluorescent or reflected light coming from the specimen arrives by way of the scanning device back at the beam splitter, passes through the latter, and is then focused onto the detection stop behind which the detectors are located. This detection arrangement is called a "descan" arrangement. Detection light that does not derive directly from the focus region takes a different light path and does not pass through the detection stop, so that a point datum is obtained which results, by successive scanning of the specimen, in a three-dimensional image. A three-dimensional image is usually achieved by acquiring image data in layers. Commercial scanning microscopes usually comprise a scanning module that is flange-mounted onto the stand of a conventional light microscope, the scanning module additionally containing all the aforesaid elements necessary for scanning a specimen.

In confocal scanning microscopy, a detection stop can be dispensed with in the case of two-photon (or multi-photon) excitation, since the excitation probability depends on the square of the photon density and thus on the square of the illuminating light intensity, which of course is much greater at the focus than in the adjacent regions. The fluorescent light being detected therefore very probably originates almost exclusively from the focus region, which renders superfluous any further differentiation, using a stop arrangement, between fluorescent photons from the focus region and fluorescent photons from the adjacent regions.

Ideally, the track of the scanning light beam on or in the specimen should describe a meander (scanning one line in the X direction at a constant Y position, then stopping the X scan and slewing by Y displacement to the next line to be scanned, then scanning that line in the negative X direction at constant Y position, etc.). In reality, however, this is not achieved as a result of various interference effects, so that troublesome image defects occur. In particular, the inertia of the moving components, positioning elements, and mirrors permits a meander-shaped scanning path only when scanning very slowly. With rapid scanning, the positioning elements are preferably triggered in sawtooth form (linearly over time), or sinusoidally (almost linearly in the central region). In actuality, the positioning elements do not exactly follow the nominal signal when scanning rapidly. The scanning track of the light beam describes a sine-like curve in the specimen. A further error source may be found in the fact that the projection of the path speed onto the X direction is less in the vicinity of the reversal points than in the linear region of the sine-like curve. Often, for example with "bad" galvanometers, an enormous deviation from the sine shape is in fact evident. It also happens that the curve shape for deflection in the positive X direction differs from the curve shape upon deflection in the opposite, negative X direction.

Image defects also occur because of inaccuracies in the sensors for determining the present mirror position, i.e. because of errors in the actual signal. These sensor measurement errors are principally attributable to friction and magnetization of the material.

DE Unexamined Application 197 02 752 A1 discloses a triggering system for a scanner drive, in particular for a laser scanning microscope, having an oscillating motor for driving an oscillating mirror that serves for linearly oscillating deflection of a beam; having a triggering unit for supplying to the oscillating motor an energizing current that is modifiable in terms of triggering frequency, frequency curve, and amplitude; having a function generator that is connected to the triggering unit; and having a measured value transducer for obtaining a sequence of data concerning the deflection positions of the oscillating mirror. The object of the invention is achieved in that the measured value transducer is linked to the function generator via a logic unit for determining correction values for the energizing current. It is thereby advantageously possible to determine correction values by means of the logic unit by evaluating the data made available by the measured value transducer regarding the actual deflection position of the oscillating mirror. Those values can in turn be used to influence the triggering frequencies output by the function generator in such a way that the deviations are minimized or completely eliminated. The manner in which the stated problem is solved by the disclosed regulated triggering system for the positioning elements is technically very complex and expensive. The disclosed triggering system is moreover limited, since at very high scanning speeds a nonlinear scanning track always at least partially occurs. When the positioning elements are resonantly operating galvanometers, practically only sine-like scanning tracks can be achieved.

SUMMARY OF THE INVENTION

It is therefore the object of the invention to describe a method for scanning a specimen that easily and reliably makes it possible, even when scanning rapidly, to generate image data largely free of image defects.

The object is achieved by a method that is characterized by the following steps:
- generating of a nominal signal for each scan point and transferring of the nominal signal to a scanning device;
- determining of an actual signal for each scan point from the setting of the scanning device;
- detecting of at least one detection signal for each scan point;
- calculating of a display signal and an image point position from the actual signal and/or the nominal signal and the detection signal; and
- assigning of the display signal to the image point position.

A further object of the invention is to describe an apparatus for scanning a specimen with which image data largely free of image defects can be generated even when scanning rapidly.

The object is achieved by an apparatus that is characterized by the following features:
- a control unit for generating of a nominal signal for each scan point, and a scanning device that receives the nominal signal;
- an apparatus for determining of an actual signal for each scan point from the setting of the scanning device;
- a detector for detecting of a detection signal for each scan point;
- a further processing unit for calculating of a display signal and an image point position from the actual signal and/or the nominal signal and the detection signal;
- a processing unit for assignment of the display signal to the image point position.

The invention has the advantage that despite the omission of complex electronic control and triggering systems, it allows image data to be generated in improved and more exact fashion, especially as regards scanning defects resulting from nonlinearities. It is very particularly advantageous that the method according to the present invention is usable when scanning both slowly and rapidly, and when resonant positioning elements are used.

In very particularly advantageous fashion, the display signal is calculated from the actual signal and/or the nominal signal and the detection signal of at least two scan points. In an embodiment, the detection signals of multiple (preferably successively scanned) scan points are averaged in weighted fashion, and the display signal of an individual image point is calculated from the value obtained, the nominal signal and the actual signal being incorporated into the weighting. The image point position is preferably calculated from the actual signal and the nominal signal as a function of the scanning parameters, such as the scanning speed, scanning track, etc. At very high scanning speeds in particular, the calculation operation contains higher-order signal corrections, so that even coarse deviations from the defined nominal scanning track, such as asymmetries and/or nonlinearities, can be compensated for. Further calibration steps, storage actions, and lookup tables are used for this purpose.

In some cases it is advantageous to take the detection signal into consideration in calculating the image point position, so that the image point position is calculated from the actual signal and/or the nominal signal and the detection signal of at least two scan points. The signals of multiple scan points can be incorporated into the calculation of the image point position as well. To eliminate jitter along an image column, the actual signals of identical phase are averaged over several periods prior to assignment.

In a preferred embodiment, an analog-digital converter is provided for digitizing the detection signal, nominal signal, and actual signal. In a preferred variant embodiment, the digitized signals are processed in a processing unit having a programmable logic module, for example a field programmable gate array (FPGA), or with a PC. Preferably at least two of the signals are simultaneously digitized and buffered.

In a preferred embodiment, determination of the actual and/or nominal signal and detection of the detection signal of successive scan points is accomplished at constant time intervals. In this embodiment, constant integration times make it particularly easy to conform to the scanning theorem.

In the assignment of the display signal to the image point position, consideration is advantageously given to the fact that the detection signals and the actual and nominal signals can have different electronic transit times and processing times. Phase differences between the signals are compensated for, in which context the phase relationship between the actual and nominal signals and detection signals must be determined, stored, and taken into account. In a very particularly preferred embodiment, the assignment operation contains an interpolation of the detection signals with respect to the actual and/or nominal signals.

In a preferred embodiment, the apparatus according to the present invention contains a data memory in which the signals can be stored. The data memory comprises individual addressable memory cells in which the display signals can be stored, the address of a memory cell being calculable from the image point position.

The scanning device is preferably configured in such a way that bidirectional scanning is made possible at least in one spatial direction. Maximum image data acquisition rates are achieved by using back-and-forth movement during scanning. In a further embodiment, a clock is provided that controls the timing of the determination and detection of the signals.

The detection signal can be both any signal coming from the specimen (e.g. reflection, scattered light, fluorescence, transmission, Raman scattering, etc.), and also an effect detected in another fashion, such as optical beam induced current (OBIC), optical beam induced resistance change (OBIRCH), optical beam induced temperature change (OBITC), etc.

Calculation of the image position and the display signal, and assignment, are preferably accomplished during scanning of the specimen. In another embodiment, calculation of the image point position and display signal, and assignment, take place subsequently, the signal initially being buffered. Subsequent processing has the advantage that the data can be filtered in terms of specimen-specific special aspects before processing. The use of a PC is a good choice here.

In particularly advantageous fashion, the method described can be used in scanning microscopes or confocal scanning microscopes. This is also the case for double confocal scanning microscope arrangements and for the use of nonlinear optical interactions with the specimen (generation of second-, third-, etc. harmonics, multi-photon fluorescence excitation, STED, coherent anti-Stokes Raman scattering [CARS], surface-enhanced Raman scattering [SERS], surface-enhanced resonant Raman scattering [SERRS], etc.).

BRIEF DESCRIPTION OF THE DRAWINGS

The subject matter of the invention is depicted schematically in the drawings and will be described below with reference to the Figures, in which.

DETAILED DESCRIPTION OF THE INVENTION

Figure 1:
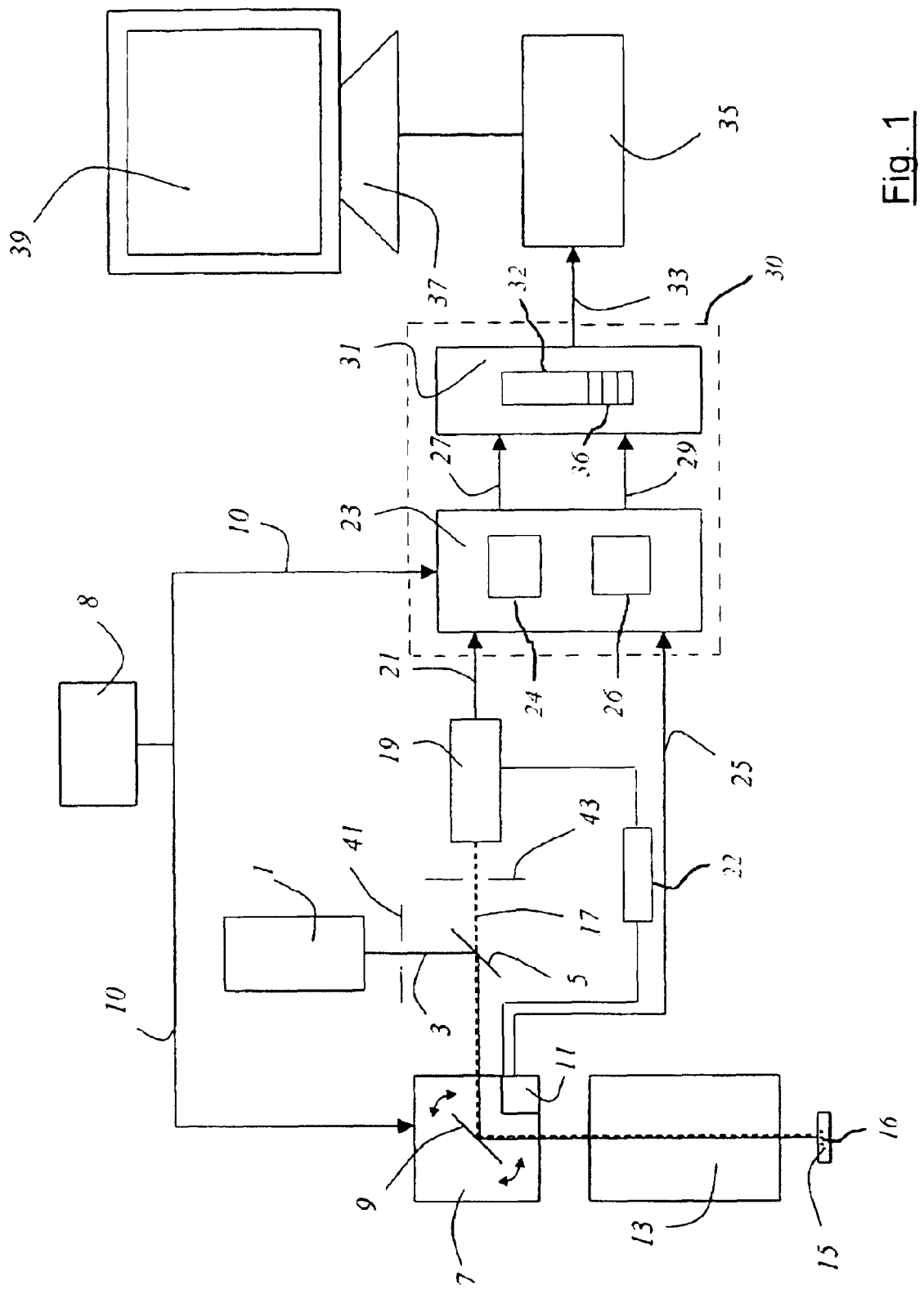
FIG. 1 shows an apparatus according to the present invention having a confocal scanning microscope.

FIG. 1 schematically shows a confocal scanning microscope. Light beam 3 coming from an illumination system 1 is reflected by a beam splitter 5 to scanning device 7, which contains a gimbal-mounted scanning mirror 9 that guides the beam through microscope optical system 13 and over or through specimen 15. Scanning device 7 receives from a control unit 8 nominal signals 10 that are converted into corresponding deflection positions of scanning mirror 9. The nominal signals are also forwarded by control unit 8 to a processing unit 23. In the case of non-transparent specimens 15, light beam 3 is guided over the specimen surface. With biological specimens 15 (preparations) or transparent specimens, light beam 3 can also be guided through specimen 15. This means that different focal planes of specimen 15 are successively scanned by light beam 3. Subsequent assembly then yields a three-dimensional image of the specimen. Light beam 3 coming from illumination system 1 is depicted as a solid line. Light 17 proceeding from specimen 15 travels through microscope optical system 13 and via scanning device 7 to beam splitter 5, passes through the latter and strikes detector 19, which is embodied as a photomultiplier. Light 17 proceeding from specimen 15 is depicted as a dashed line. Electrical detection signals 21 proportional to the power level of light 17 proceeding from the specimen are generated in detector 19 and forwarded to processing unit 23. Actual signals 25 sensed in scanning device 7 with the aid of an inductively or capacitatively operating apparatus 11 for determining an actual signal are also transferred to processing unit 23. The incoming analog signals are first digitized in processing unit 23 using analog-to-digital converter 24. Processing unit 23 also includes buffer 26 enabling at least two of the signals to be simultaneously digitized and buffered. Processing unit 23 further includes three delay elements for compensating for transit time differences (not depicted), of which one is traversed by detection signals 21, another by nominal signals 10, and the third by actual signals 25. In processing unit 23, calculation of display signals 27 and calculation of image point positions 29 from the actual signals, nominal signals, and detection signals is performed according to a definable algorithm. Processing unit 23 contains a programmable logic module that is embodied as a FPGA.

Figure 2:
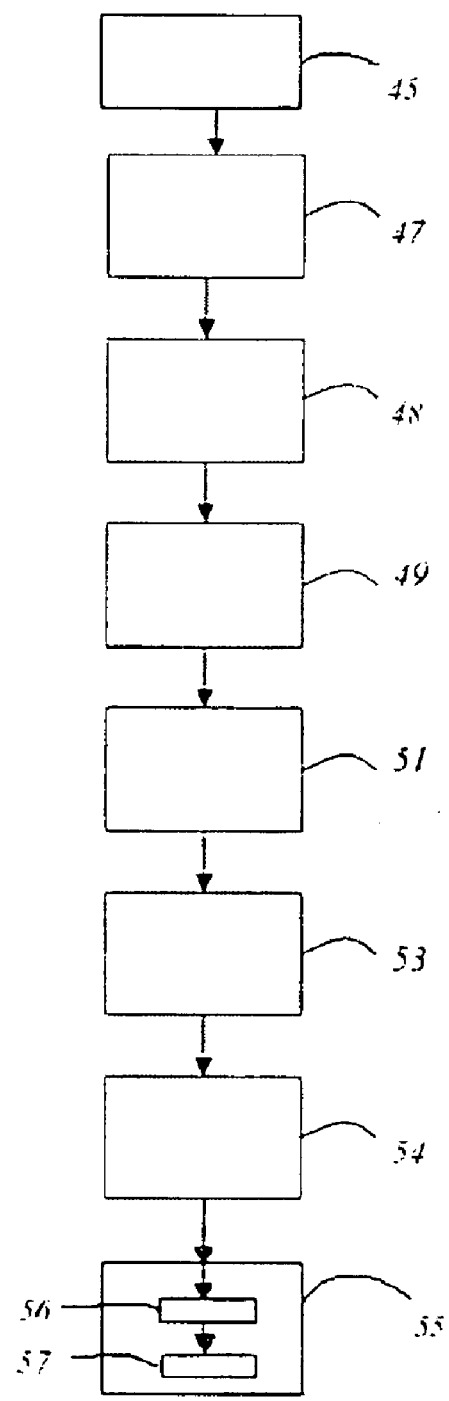
FIG. 2 is a flow chart of the method according to the present invention.

The calculated display signals 27 and image point positions 29 are transferred to a further processing unit 31 in which assignment of display signals 27 to image point positions 29 is performed. Processing unit 31 includes data memory 32 in which the signals can be stored. Data memory 32 includes individual addressable memory cells 36 in which the display signals can be stored. In an embodiment, processing units 23 and 31 are combined into one common processing unit 30, as indicating with dashed lines in FIG. 1. The assigned image data 33 are forwarded to a PC 35 on whose monitor 37 image 39 of specimen 15 is displayed. Illumination pinhole 41 and detection pinhole 43 that are usually provided in a confocal scanning microscope are schematically drawn in for the sake of completeness. Omitted in the interest of better clarity, however, are certain optical elements for guiding and shaping the light beams. These are sufficiently familiar to the person skilled in this art. FIG. 2 is a flow chart of the method according to the present invention. Generation 45 of a nominal signal for each of a plurality of scanning points 16, and transfer 47 of the nominal signal to a scanning device 7, are performed first, The nominal signal is generated by a control unit 8. The nominal signal can have almost any desired time dependency. Square-wave, triangular, and sine functions are particularly advantageous. With very rapid scanning, sinusoidal triggering is advisable. Scanning 48 is performed so as to scan the specimen at the plurality of scanning points 16. Scanning 48 in an embodiment is performed bidirectionally at least in one spatial direction. In the next step, determination 49 of an actual signal is accomplished for each scanning point from the setting of the scan device. For this purpose, the scanning device is preferably equipped with a sensor as means for determining the actual signal, which for example determines the position of the deflecting mirror. The sensor preferably operates capacitatively, inductively, or trigonometrically. In a further step, detection 51 of at least one detection signal is performed for each scan point. A photomultiplier is preferably used as detector 19, in particular for low detected light power levels. The use of other detectors, for example semiconductor detectors, photodiodes, photocells, CCD chips, and multi-band detectors, is also possible. In an embodiment, clock 22 is provided for controlling the timing of determination 49 and detection 51.

In the next step calculation 53 of a display signal 27 and an image point position 29 from actual signal 25 and/or nominal signal 10 and detection signal 21 is performed. For that purpose, preferably several algorithms are defined, from which the user can select the particular one suitable for a specific specimen. In the last step, assignment 55 of display signal 27 to image point position 29 is performed. To eliminate jitter alone an image column, in the embodiment depicted an averaging 54 of the actual signals of identical phase over several periods is performed prior to assignment 55. In the embodiment depicted, assignment 55 includes an interpolation 57 of the detection signals with respect to the actual and/or nominal signals. Moreover, in the embodiment depicted, assignment 55 includes compensation 56 of the phase differences between the signals, in which context the phase relationship between the actual and nominal signals and detection signals are determined, stored, and taken into account. The image data thus obtained can be assembled into an image 39, for example with a PC 35, and displayed on a monitor 37.

The present invention has been described with reference to a particular embodiment. It is self-evident, however, that changes and modifications can be made without thereby leaving the range of protection of the following claims.

What is claimed is:

1. A method for point-by-point scanning of a specimen, comprising the following steps:

scanning of the specimen at a plurality of scan points using a scanning device;

generating of a nominal signal for each scan point and transferring of the nominal signal to the scanning device;

determining of an actual signal for each scan point from a setting of the scanning device;

detecting of at least one detection signal for each scan point;

calculating of a display signal and an image point position as a function of the actual signal and the detection signal; and assigning of the display signal to the image point position.

2. The method as defined in claim 1, wherein the display signal is calculated from the respective actual signal and the respective nominal signal and the respective at least one detection signal of at least two of the scan points.

3. The method as defined in claim 1, wherein the image point position is calculated from the respective actual signal and the respective nominal signal and the respective detection signal of at least two of the scan points.

4. The method as defined in one of claims 2 or 3, wherein the scan points are successive scan points.

5. The method as defined in claim 1, wherein the detection signal and the nominal signal and actual signal are digitized.

6. The method as defined in claim 5, wherein at least two of the signals are simultaneously digitized and buffered.

7. The method as defined in claim 4, wherein determination of the respective actual signal and detection of the respective at least one detection signal of successive scan points is accomplished at constant time intervals.

8. The method as defined in claim 4, wherein the assignment operation contains an interpolation of the respective at least one detection signal with respect to the respective actual and/or respective nominal signal.

9. The method as defined in claim 1 further comprising the step of:

compensating phase differences between at least two of the actual, detection, and nominal signals.

10. The method as defined in claim 1, wherein the actual signals of identical phase are averaged over several periods prior to assignment.

11. The method as defined in claim 1, wherein scanning is accomplished bidirectionally at least in one spatial direction.

12. An apparatus for point-by-point scanning of a specimen, comprising:

a scanning device for scanning of the specimen at a plurality of scan points;

a control unit for generating of a nominal signal for each scan point, the scanning device receiving the nominal signal;

an apparatus for determining of an actual signal for each scan point from a setting of the scanning device;

a detector for detecting of a detection signal for each scan point;

a further processing unit for calculating of a display signal and an image point position as a function of the actual signal and the detection signal;

a processing unit for assignment of the display signal to the image point position.

13. The apparatus as defined in claim 12 further comprising a monitor for displaying an image of the specimen.

14. The apparatus as defined in claim 12 further comprising at least one analog-digital converter for digitizing the detection signal, the nominal signal, and the actual signal.

15. The apparatus as defined in claim 12 further comprising a data memory in which the display signal can be stored.

16. The apparatus as defined in claim 15, wherein the data memory comprises individual addressable memory cells in which the display signal can be stored, the address of a memory cell being calculable from the image point position.

17. The apparatus as defined in claim 12 further comprising a clock that controls the timing of the determination of the actual signal and the detection of the detection signal.

18. The apparatus as defined in claim 12, wherein the display signal can be assigned to the image point position during scanning.

19. The apparatus as defined in claim 12, wherein the processing unit and the further processing unit are combined into a common processing unit.

* * * * *

UNITED STATES PATENT AND TRADEMARK OFFICE
CERTIFICATE OF CORRECTION

PATENT NO. : 6,914,238 B2
DATED : July 5, 2005
INVENTOR(S) : Johann Engelhardt and Bernd Widzgowski It is certified that error appears in the above-identified patent and that said Letters Patent is hereby corrected as shown below:

Title page,
Item [56], References Cited, FOREIGN PATENT DOCUMENTS, "WO 99 47 964" reference has a publication date of -- 9/99 -- instead of "2/1999" as listed on the cover.

Column 6,
Line 4, should read -- first. The nominal signal is generated by a control unit 8. The --, instead of "first, The nominal signal is generated by a control unit 8. The".
Line 34, should read -- eliminate jitter along an image column, in the embodiment -- instead of "eliminate jitter alone an image column, in the embodiment".

Signed and Sealed this

Twenty-fifth Day of October, 2005

JON W. DUDAS
*Director of the United States Patent and Trademark Office*